3,193,521
OLEFIN POLYMER STABILIZED
WITH BORON COMPOUNDS
Wolfgang Jasching, Bickenbach an der Bergstrasse, Germany, assignor to Carlisle Chemical Works, Inc., Reading, Ohio, a corporation of Ohio
No Drawing. Filed Nov. 22, 1961, Ser. No. 154,343
Claims priority, application Germany, Dec. 23, 1960, D 35,018
7 Claims. (Cl. 260—45.8)

The present invention relates to the stabilization of high molecular weight polymers of monolefins having 2 to 4 carbon atoms. Such materials which are prepared for example by the polymerization of ethylene, propylene and isobutylene, undergo changes due to the prolonged effect of light and atmospheric air, especially the oxygen component thereof. The changes become apparent in the deterioration of the mechanical properties of the polymers. Increased temperature favors this deterioration. Consequently it has been found necessary to stabilize these high polymers before their processing by the addition of a protective material which acts in general, as an antioxidant. Thus various phenols, aromatic amines and sulfur-containing organic compounds are known stabilizers for such monoolefin polymers.

It is an object of the present invention to prepare novel stabilized compositons containing solid polymers of monoolefins having 2 to 4 carbon atoms.

Another object is to stabilize high molecular weight polymers of monoolefins having 2 to 4 carbon atoms with synergistic stabilizer compositions.

A more specific object is to prepare stabilized polypropylene compositions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing as stabilizers for high molecular weight polymers of monoolefins having 2 to 4 carbon atoms organic boron compounds having at least one direct carbon to boron bond. These organic boron compounds stabilize the polymers very well against the effect of light and air, or oxygen, even with heating, without causing discoloration. The stabilizers can be used in an amount of 0.05–10% by weight of the polymer. Generally not over 2.5% of stabilizer is employed. Preferably 0.1–0.2% of stabilizer is employed since this amount has generally been found sufficient to give the desired stabilization.

All parts and percentages of stabilizer are by weight of the polymer, e.g. polypropylene, being stabilized.

According to the invention there can be used monohydrocarbon or heterocyclic boric acids (boronic acids) having the formula

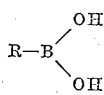

(I)

of the corresponding boroxole trimers formed by dehydration of the boric acids I and having the formula

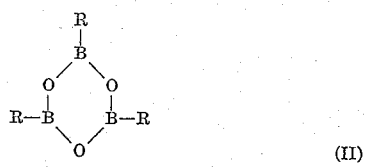

(II)

In the Formulae I and II R can be alkyl (including cycloalkyl) alkenyl, aryl or heterocyclic, e.g. thienyl, furyl, pyridyl or other group wherein the hetero atoms are oxygen, sulfur or nitrogen. Examples of suitable compounds within the Formulae I and II are methylboronic acid, ethylboronic acid, n-butylboronic acid, dodecylboronic acid, octadecylboronic acid, phenylboronic acid, o-tolylboronic acid, ethylphenylboronic acid, p-tolylboronic acid, allylboronic acid, o-vinylphenylboronic acid, cyclohexylboronic acid, p-butylphenylboronic acid, benzylboronic acid, octadecenylboronic acid, alphanaphthaleneboronic acid, vinylboronic acid, vinylphenylboronic acid, thienylboronic acid, furylboronic acid, pyridylboronic acid, methylboroxide (mesitylboroxole), phenylboroxole (triphenyl boroxole), ethylboroxole, butylboroxole, (tributylboroxine), octadecylboroxole, o-tolylboroxole, p-tolylboroxole, m-tolylboroxole, p-butylphenylboroxole, octadecenylboroxole, allylboroxole, cyclohexylboroxole, ethylphenylboroxole, vinylboroxole, p-vinylphenylboroxole, thienylboroxole, furylboroxole and pyridylboroxole. The boroxoles are preferred. The preferred boroxole is phenylboroxole.

There can also be used derivatives of the boric (boronic) acids of Formula I made by reacting the acid of Formula I with a diamine, a dihydroxy compound or a dimercaptan. Such compounds have the formulae

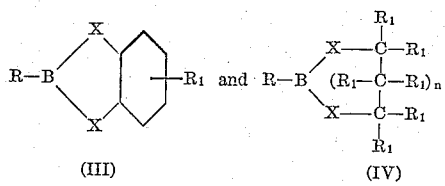

(III)                    (IV)

where R is as defined above, $R_1$ is hydrogen or alkyl, $n$ is an integer from zero to eight and X is oxygen, sulfur or imino (NH). Examples of suitable compounds coming with Formula III are the reaction product of phenylboronic acid and o-phenylene diamine, the reaction product of phenylboronic acid and o-dithiophenol, the reaction product of phenylboronic acid and o--dihydroxybenzene, the reaction product of methylboronic and o-phenylenediamine, the reaction product of thienylboronic acid and o-phenylenediamine, the reaction product of furylboronic acid and a phenylenediamine, the reaction product of o-tolylboronic acid and o-phenylenediamine, the reaction product of phenylboronic acid and 1,2-diamino-4-methylbenzene, the reaction product of butylboronic acid and o-dihydroxybenzene, the reaction product of cyclohexylboronic acid and o-phenylenediamine, the reaction product of octylboronic acid and o-dithiophenol. Suitable compounds within Formula IV include the reaction product of phenylboronic acid and ethylene glycol, the reaction product of butylboronic acid and 2.5-hexanediol, the reaction product of phenylboronic acid and propylene glycol, the reaction product of octylboronic acid and 2-methyl-2,4-pentanediol, the reaction product of phenylboronic acid and trimethylene glycol, the reaction product of phenylboronic acid and neopentylene glycol, the reaction product of phenylboronic acid and 2,2-dimethylbutanediol-1,3, the reaction product of phenylboronic acid and 2,3-dimethylbutanediol-2,3, the reaction product of phenylboronic acid and 1,2-ethanedithiol, the reaction product of allylboronic acid and ethylene glycol, the reaction product of phenylboronic acid and ethylene diamine, the reaction product of phenylboronic acid and trimethylene diamine, the reaction product of pridylboronic acid and trimethylene glycol, the reaction product of phenylboronic acid and 1,3-propanedithiol, the reaction product of thienylboronic acid and 1,3-butylene glycol, the reaction product of propylboronic acid and ethylene glycol, the reaction product of furylboronic acid and hexylene glycol, the reaction product of butylboronic acid and trimethylene glycol and the reaction product of cyclohexyl boronic acid and hexylene glycol.

Additionally there can be used esters of monohydrocarbon boronic acids of the formulae

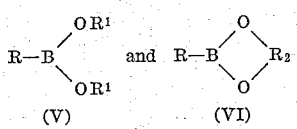

where R is as defined above, $R^1$ is alkyl, acyl or aryl and $R_2$ is diacyl. Examples of suitable compounds within Formulae V and VI are diethyl phenylboronate (diethyl ester of phenylboronic acid), dimethyl phenylboronate, monopropyl boric acid dimethyl ester, dioctadecyl phenylboronate, diethyl octylboronate, diphenyl phenyl boronate, di-amyl (allyl) boronate, di o-cresyl phenylboronate, di n-butyl phenylboronate diethyl n-hexylboronate, dicyclohexyl phenylboronate diphenyl butylboronate, dimethyl (cyclohexyl) boronate, diacetyl phenylboronate, dimethyl benzeneboronate, dipropionyl phenylboronate, distearoyl phenylboronate, dibutyl cyclohexylboronate, dibenzoyl phenylboronate, diacetyl butylboronate, distearoyl methylboronate, diacetyl thienylboronate, distearoyl furylboronate, diethyl thienylboronate, dibutyl furylboronate, the reaction product of phenylboronic acid and succinic acid, the reaction product of phenylboronic acid and oxalic acid, the reaction product of phenylboronic acid and malonic acid, the reaction product of butylboronic acid and oxalic acid and the reaction product of allylboronic acid and malonic acid.

Furthermore there can be used dihydrocarbon or heterocyclic boric acids (borinic acids) or esters or anhydrides having the formulae

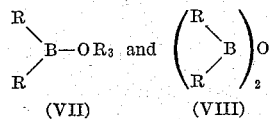

where R is defined as above and $R_3$ is hydrogen, hydrocarbon or acyl. Examples of suitable compounds within Formulae VII and VIII are diphenylborinic acid (diphenylhydroxylborane), butyl phenylborinic acid, dibutylborinic acid, dithienyl borinic acid dimethylborinic acid, di o-tolylborinic acid, difurylborinic acid diotadecylborinic acid, ethyl diphenylboronite, phenyl-1-naphthylhydroxylborane, phenyl diphenylboronite, methyl diphenylboronite, diethyl boric acid hexyl ester, octadecyl diphenylboronite lauryl dibutylboronite, butyl dibutylborinite, ethyl dicyclohexylboronite, acetyl diphenylboronite, acetyl dibutylboronite, diphenylboron anhydride

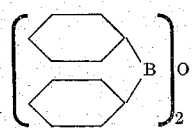

di o-tolylboron anhydride, dibutylboron anhydride butyl diallylboronite, dicyclohexylboron anhydride, methyl dithienylboronite, butyl difurylboronite, and ethyl dipyridylboronite.

Also there can be used dihydrocarbon and diheterocyclic thioboric acid esters (thioborinic acid esters) of the formula

where R is as defined above. Examples of such compounds are methyl diphenylthioboronite, butyl diphenylthioboronite, phenyl diphenylthioboronite, diphenylthioboronite, butyl dimethylthioboronite, methyl dioctadecylthioboronite, cyclohexyl dilaurylthioboronite.

Additionally there can be used trihydrocarbon or triheterocyclic boron compounds such as tri-α-naphthylboron

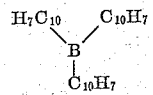

triethylboron, tributylboron, tridecylboron, triphenylboron, tris (cyclopentadienyl) boron, tri-alpha-naphthylboron, tri n-pentylboron, trithienylboron, trifurylboron, tripyridiylboron, tributylboron, trimethallylboron, tri-tolylboron, tri-octadecylboron, tri-tertbutylboron, tricyclohexylboron.

Also there can be used dihydrocarbon and diheterocyclic boron halogenides and hydrides of the formula

where R is as defined above and X is hydrogen or halogen.

Examples of such compounds are diphenylboron chloride, diphenylboron hydride, diphenylboron bromide, diphenylboron fluoride, diphenylboron iodide, di o-tolylboron chloride, dibutylboron chloride, dioctadecylboron chloride, dithienylboron chloride, difurylboron chloride, dihexylboron hydride, dicyclohexylboron chloride, dibutylboron bromide, dipyridylboron chloride and diallylboron chloride.

The oxygen atom or atoms directly attached to the boron in many of the above formulae can be replaced completely or in part by halogen, sulfur, nitrogen or hydrogen.

In addition to the compounds set forth supra there can be used other boron compounds such as tris (2-chlorovinyl) borane, alpha-chloroethylphenyl boroxole, chlorobis (2-chlorovinyl) borane, hexaphenylborazole, B-tribenzyl-N-triphenylborazole, N-triphenyl-B-phenyl-B'-methyl-B''-allylborazole, B-trioctadecyl-N-tri-n-propylborazole, p-alpha-bromoethylphenyl boroxole, iminodiethyl (p-vinylphenyl) boronate, di-n-butyl (p-vinylphenyl) boronate, glyceryl p-vinyl-phenyl boronate, 5-(2-aminoethoxy)-10, 11-dihydrodibenzo [b,f]-borepine, alpha-bromoethylphenyl boroxole, 1-n-butylboracyclohexane, 1-n-butylboracyclopentane, butylboron dichloride, chlorobenzeneboronic acid, n-hexyldifluoroborine, dimethyl ester of chlorovinylboronic acid (dimethyl chlorovinylboronate) cyclic ethylene glycol ester of chlorovinylboronic acid, octylthio chlorovinylboron chloride, chlorovinylboron dichloride, vinylboron dichloride, triethynylboron pyridine, ethyl difluoroboron ammonia, triphenylboron ethyl amine, diethyl n-propylboron ammonia, tribenzylboron dimethyl amine, diphenyl methoxy boron methylamine, B, B', B''-triallyl-N,N',N''-triphenylborazole, B-triallylborazole, phenylboron dichloride, tolylboron dichloride, naphthylboron dichloride, biphenylene-bis (borondichloride), and tricyclohexylboron amylamine.

Furthermore in many cases it is advantageous to use the above mentioned compounds in the form of their addition compounds with nitrogen bases or as amine complexes, especially pyridine complexes, other amines can be used such as tributylamine, morpholine, triethanolamine, dibutylamine, or aniline.

Comparative experiments have shown that the organic boron compounds used in the present invention are superior in their effect to the stabilizers used up until now. Even dilaurylthiopropionate which is the best of the known stabilizers for mono-olefin polymers is far less effective for example, than phenylboroxole.

While the stabilizers of the present invention can be used with polyethylene, polypropylene, ethylene propylene copolymers (e.g., a 50-50 copolymer), polybutylene and polyisobutylene they are preferably employed with polymers and copolymers of propylene. The problems of stabilizing polypropylene are more complex than those of stabilizing polyethylene. Polypropylene contains a tertiary carbon atom which is easily oxidized. This is missing from polyethylene.

The present invention is suitable for the stabilization of the monolefin polymers regardless of the method employed to prepare the polymer. Thus, there can be stabilized polyethylene, polypropylene, polybutylene and copolymers of ethylene with propylene prepared with Ziegler type polymerization catalysts, e.g., trialkyl aluminum (tributyl aluminum) with titanium tetrachloride or dibutyl beryllium with titanium tetrachloride. The polymers can be prepared using any of the Ziegler type of catalysts as set forth in Salyer Patent 2,985,617, issued May 23, 1961, for example. However, the stabilizers of the present invention can be employed with polymers of monoolefins prepared by other processes, e.g., polyethylene prepared under high pressure as set forth in Fawcett Patent 2,153,553, for example, or polyethylene, polypropylene or copolymers prepared using Phillips Petroleum or Standard Oil of Indiana type catalysts.

Frequently it is desirable to add other stabilizers in addition to the organoboron compounds. Thus, good results can be obtained by employing in addition to the organoboron compound a neutral sulfur compound having a thio linkage beta to a carbon atom having both a hydrogen atom and a carboxyl group attached thereto. Such compounds are used in an amount of 0.01-10% by weight, preferably 0.5%. The preferred thio compound is dilauryl thiodipropionate. Other thio compounds include distearyl-3,3'-thio-dipropionate (dioctadecylthiodipropionate), dicyclohexyl-3,3'-thiodipropionate, dicetyl-3,3'-thiodipropionate, dihexyl-3,3'-thiodipropionate, dioctyl-3,3'-thiodipropionate, dibenzyl-3,3'-thiodipropionate, lauryl myristyl-3,3'-thiodipropionate, diphenyl-3,3'-thiodipropionate, di-p-methoxyphenyl-3,3'-thiodipropionate, didecyl-3,3'-thiodipropionate, lauryl ester of 3-methylmercapto propionic acid, lauryl ester of 3-butylmercapto propionic acid, lauryl ester of 3-laurylmercapto propionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy) phenylmercapto propionic acid, lauryl ester of 3-cyclohexylmercapto propionic acid, lauryl ester of 3-hydroxymethylmercapto propionic acid, myristyl ester of 3-hydroxyethylmercapto propionic acid, octyl ester of 3-methoxymethylmercapto propionic acid, dilauryl ester of 3-carboxymethylmercapto propionic acid, dilauryl ester of 3-carboxypropylmercapto propionic acid, dilauryl ester of 3-carboxypropylmercapto propionic acid, dilauryl-4,7-dithiasebacate, dilauryl-4,7,8,11-tetrathiatetradecandioate, dimyristyl-4,11-dithiatetradecandioate, lauryl-3-benzothiazylmercaptopropionate, as well as other alkyl, cycloalkyl and aryl esters of the beta thiocarboxylic acids set forth in Gribbins Patent 2,519,755. Preferably, the esterifying alcohol has 10 to 18 carbon atoms.

Other beta thiocarboxylic acids includes stearyl (1,2-dicarboethoxyethylthio) acetate, stearyl (1,2-dicarbolauryloxyethylthio) acetate, lauryl (1,2-dicarboethoxyethylthio) acetate or the like. Compounds of this type can be made in known fashion by addition of an alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilaurylmaleate, phenylthiodioctyl maleate, cetyl (1,2-dicarboethoxyethylthio) propionate and benzylthiodimyristyl maleate.

Similarly, useful beta thiocarboxyl compounds can be prepared by addition of the RSH compounds as defined above across the double bond of dialkyl itaconates, dialkyl citraconates, dialkyl fumarates, or trialkyl aconitates, e.g., the addition product of lauryl mercaptan with dibutyl itaconate, the addition product of the stearyl ester of mercapoacetic acid with dilauryl itaconate, the addition product of butyl mercaptan with dilauryl citraconate, the addition product of lauryl mercaptan with tributyl aconitate, the addition product of the lauryl ester of mercapto propionic acid with triethyl aconitate.

The thermal stability of polypropylene and other polymers of a monoolefin is adversely affected by impurities including residual catalysts. When thermal stability is important in addition to oxidative stability it has been found valuable to include alkaline earth metal salts of fatty acids in an amount of 0.01-10% by weight, preferably 0.1-5% in the organoboron formulations. Examples of such salts are calcium stearate, calcium 2-ethylhexoate, calcium octoate, calcium oleate, calcium ricinoleate, calcium myristate, calcium palmitate, calcium laurate, barium laurate, barium stearate and magnesium stearate. Other fatty acid salts such as cadmium 2-ethylhexoate, cadmium stearate and zinc stearate can also be employed.

The addition of phenolic antioxidants in an amount of 0.01-10% by weight, preferably 0.1-5% also is frequently of value. Examples of such phenols include 2,6-di-t-butyl-p-cresol, butylated hydroxyanisole, propyl gallate, 4,4'-thiobis (6-tertiary-butyl-m-cresol), 4,4'-cyclohexylidene diphenol, 2,5-di-tertiary-amyl hydroquinone, 4,4'-butylidene bis(6-tertiary-butyl-m-cresol), hydroquinone monobenzyl ether, 2,2'-methylene-bis 4-methyl-6-t-butylphenol), as well as the other phenols set forth in Salyer Patent 2,985,617. Other suitable phenols include 2-tertiary-butyl-4-decyloxyphenol, 2-tertiary-butyl-4-dodecyloxyphenol, 2-tertiary-butyl-4-octadecyloxyphenol, 4,4'-methylene-bis-(2,6-di-tertiary butyl phenol), p-aminophenol, N-lauryl-p-amino phenol, 4,4'-thiobis (3-methyl-6-t-butylphenol), bis (o-(1,1,3,3-tetramethylbutyl) phenol) sulfide, 4-acetyl-β-resorcylic acid, A-stage p-tertiary butylphenol-formaldehyde resin, 4-dodecyloxy-2-hydroxy-benzophenone, 3-hydroxy-4-(phenylcarbonyl) phenyl palmitate, n-dodecyl ester of 3-hydroxy-4-(phenylcarbonyl) phenoxyacetic acid and t-butylphenol.

Likewise there can be incorporated epoxy compounds in an amount of 0.01-10% by weight, preferably 0.1-5% in the organoboron formulations. Examples of such epoxy compounds include epoxidized soya oil, epoxidized lard oil, epoxidized castor oil, epoxidized peanut oil, epoxidized corn oil, epichlorhydrin-bisphenol A resins, phenoxypropylene oxide, butoxy-propylene oxide, epoxidized neopentylene oleate, glycidyl epoxystearate, epoxidized α-olefins, epoxidized glycidyl soyate, dicyclopentadiene dioxide, epoxidized butyl tallate, styrene oxide, dipentene dioxide, glycidol, vinyl cyclohexene dioxide, glycidyl ether of resorcinol, glycidyl ether of hydroquinone, glycidyl ether of 1,5-dihydroxy naphthalene, epoxidized linseed oil fatty acids, allyl glycidyl ether, 4-(2,3-epoxypropoxy) acetyl phenone, mesityl oxide epoxide, 2-ethyl-3-propyl glycidamide, glycidyl ethers of glycerine, pentaerythritol and sorbitol, and 3,4-epoxycyclohexane-1,1-dimethanol bis (9,10-epoxystearate).

Furthermore there can be incorporated neutral esters of citric acid in an amount of 0.01-10% by weight, preferably 0.1-5%. Examples of such citrates include neutral citreates having the formula

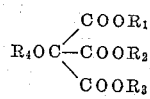

where $R_1$, $R_2$ and $R_3$ are selected from the group consisting of hydrocarbon, e.g., alkyl, aryl and cycloalkyl, and haloaryl and $R_4$ is selected from the group consisting of hydrogen, hydrocarbon, e.g., alkyl, aryl and cycloalkyl, or acyl groups. Preferably, the acyl group has 2 to 4 carbon atoms. Typical examples of such citrates are triethyl citrate, trimethyl citrate, tripropyl citrate, triisopropyl citrate, tributyl citrate, propyldibutyl citrate, tri tertiary butyl citrate, triamyl citrate, trihexyl citrate, trioctyl citrate, tridecyl citrate, trioctadecyl citrate, tricyclohexyl citrate, triphenyl citrate, tribenzyl citrate, tri p-tolyl citrate, tri p-chlorophenyl citrate, acetyl tripropyl citrate, acetyl tributyl citrate, acetyl propyldibutyl citrate, acetyl triamyl citrate, acetyl trioctyl citrate, acetyl trioctadecyl citrate, propionyl tributyl citrate, butyryl tributyl citrate, butyl tributyl citrate, phenyl tributyl citrate, chlorophenyl tributyl citrate, and acetyl triphenyl citrate.

The following examples illustrate the good effects of the new stabilizers in typical aging tests.

EXAMPLE 1

One sample of unstabilized polypropylene (molecular weight 80,000–100,000) was treated with 0.2% dilaurylthiodipropionate and another sample of the same polypropylene was treated with 0.2% of phenylboroxole (triphenylboroxole). The sample were milled for 10 minutes at 100° C. and subsequently were extruded for 2 minutes at 210° C. and 50 atmospheric pressure and then for 3 minutes at 210° C. and 250 atmospheric pressure to 0.5 mm. thick films. A film of the same polypropylene without any stabilizer was prepared under the same experimental conditions. To determine the change of the mechanical properties under the influence of heat, these three samples were aged artificially by heating at 145° C. and were subsequently tested. The aging results are shown in Table 1.

*Table 1*

| Sample | Stabilizer | Heating time (min.) | Elongation | Melt index at 190° C., 5 kg. (g./10 min.) |
|---|---|---|---|---|
| 1 | None | 0 | 260 | 0.42 |
| 2 | None | 60 | 14 | 0.87 |
| 3 | None | 120 | 8 | 0.89 |
| 4 | Dilauryl thiodipropionate | 0 | 605 | 0.49 |
| 5 | Dilauryl thiodipropionate | 60 | 18 | 0.79 |
| 6 | Dilauryl thiodipropionate | 120 | 16 | 0.84 |
| 7 | Phenylboroxole | 0 | 600 | 0.49 |
| 8 | Phenylboroxole | 60 | 461 | 0.54 |
| 9 | Phenylboroxole | 120 | 140 | 0.55 |

EXAMPLE 2

Unstabilized polypropylene (molecular weight 80,000–100,000) containing 2% phenylboroxole was worked into a film as in Example 1. Under the same conditions a comparison film without a stabilizer was prepared. In order to determine the influence of heat and light, samples of the films were aged artificially by the effect of heat at 120° C. and other samples were aged artificially by the effect of light in a Fade-O-Meter. Table 2 shows the characteristic results of aging in flex tests.

*Table 2*

| Sample | Stabilizer | Aging | Time | Results |
|---|---|---|---|---|
| 1 | None | 120° C | 17 hours | Breaks on bending at less than 180°. |
| 2 | do | Exposure | 60 hours | Do. |
| 3 | Phenylboroxole | 120° C | 22 days | Still flexible on bending up to 180°. |
| 4 | do | Exposure | 350 hours | Do. |

EXAMPLE 3

To unstabilized polypropylene there was added 0.2% of mesitylboroxole and the mixture worked into a film as in Example 1. A comparison film without a stabilizer was prepared under the same conditions. In order to determine the effect of heat and light, various samples of these films were aged artificially by heating at 120 and 145° C. and by the effect of light in a Fade-O-Meter. Table 3 shows the aging results.

*Table 3*

| Sample | Stabilizer | Aging | Time | Results |
|---|---|---|---|---|
| 1 | None | 120° C | 17 hours | Breaks on bending at less than 180°. |
| 2 | do | 145° C | 40 min | Do. |
| 3 | do | Exposure | 60 hours | Do. |
| 4 | Mesitylboroxole | 120° C | 73 hours | Still flexible on bending up to 180°. |
| 5 | do | 145° C | 165 min | Do. |
| 6 | do | Exposure | 150 hours | Do. |

EXAMPLE 4

There was added 0.2% of thienylboroxole to unstabilized polypropylene and the mixture worked into a film as in Example 1. Under the same conditions a comparison film without a stabilizer was prepared. In order to determine the effect of heat and light, various samples of these films were aged artificially by the effect of heat at 145° C. and by the effect of light in a Fade-O-Meter. Table 4 shows the aging results.

*Table 4*

| Sample | Stabilizer | Aging | Time | Results |
|---|---|---|---|---|
| 1 | None | 145° C | 40 min | Breaks on bending at less than 180°. |
| 2 | do | Exposure | 60 hours | Do. |
| 3 | Thienylboroxole | 145° C | 140 min | Still flexible on bending up to 180°. |
| 4 | do | Exposure | 130 hours | Do. |

EXAMPLE 5

Unstabilized polypropylene with the addition of 0.2% of triphenylboron-pyridine complex was worked into a film as in Example 1. In order to determine the influence of heat, samples of the film with the stabilizer addition as well as a sample of the film without the stabilizer were aged artificially by heating at 150° C.

The sample with the addition of 0.2% triphenylboron-pyridine complex was still elastic after 105 minutes and was still expandible. The sample without the stabilizer addition was brittle after 30 minutes and broke on bending at less than 180°.

EXAMPLE 6

Unstabilized low pressure polyethylene was mixed with 0.1% of phenylboroxole in one sample and with 0.2% phenylboroxole in a second sample. The samples were milled for 10 minutes at 130° C. and subsequently were extruded for 2 minutes at 150° C. and 50 atm. pressure and then for 3 minutes at 150° C. and 250 atm. pressure to 0.5 mm. thick film. A film without the addition of stabilizer was prepared under the same conditions. In order to test the influence of heat on the mechanical properties of unstabilized and stabilized polyethylene, these three films were aged artificially by heating at 100° C. The aging results are shown in Table 5. The excellent stabilizing effect of phenylboroxole on polyethylene is clearly illustrated.

Table 5

|  | No stabilizer | 0.1% phenylboroxole | 0.2% phenylboroxole |
|---|---|---|---|
| Tensile strength after 20 min. at 100° C. | 202 | 285 | 327 |

EXAMPLE 7

To polypropylene (molecular weight 80,000–100,000) there was added a mixture of 0.2% of phenylboroxole and 0.7% of dilauryl thiodipropionate to obtain a stabilized polymer.

EXAMPLE 8

To the polypropylene (molecular weight 80,000–100,000) there was added 0.2% of phenylboroxole and 0.2% of 2,6-di-t-butyl-p-cresol to obtain a stabilized polymer.

EXAMPLE 9

To the polypropylene (molecular weight 80,000–100,000) there was added 0.125% of phenylboroxole, 0.125% of dilauryl thiodipropionate, 0.125% of 2,6-di-t-butyl-p-cresol and 0.125% of epoxidized soybean oil to obtain a stabilized polymer.

What is claimed is:

1. A solid polymer selected from the group consisting of (1) homopolymers of a monoolefin having 2 to 4 carbon atoms selected from the group consisting of ethylene, propylene, butylene and isobutylene, and (2) copolymers of mixtures of such monoolefins with each other stabilized with a small but effective amount of a trihydrocarbon boroxole.

2. A solid polymer selected from the group consisting of (1) homopolymers of a monoolefin having 2 to 4 carbon atoms selected from the group consisting of ethylene, propylene, butylene and isobutylene, and (2) copolymers of mixtures of such monoolefins with each other stabilized with a small but effective amount of triphenylboroxole.

3. Solid polypropylene stabilized with 0.05 to 2.5% of triphenylboroxole.

4. Solid polypropylene stabilized with a small but effective amount of a trihydrocarbonboroxole.

5. Solid polypropylene stabilized with a small but effective amount of trithienylboroxole.

6. A solid polymer selected from the group consisting of (1) homopolymers of a monoolefin having 2 to 4 carbon atoms selected from the group consisting of ethylene, propylene, butylene and isobutylene, and (2) copolymers of mixtures of such monoolefins with each other stabilized with a small but effective amount of a nitrogen base complex of a trihydrocarbonborane.

7. Solid polypropylene stabilized with a small but effective amount of the pyridine complex of triphenylborane.

References Cited by the Examiner

UNITED STATES PATENTS

| 2,526,506 | 10/50 | Rogers et al. | 260—45.7 |
| 2,617,783 | 11/52 | Slocombe et al. | 260—45.7 |
| 2,952,659 | 9/60 | Pfeifer | 260—45.7 |
| 3,131,164 | 4/64 | Doyle et al. | 260—45.8 |

LEON J. BERCOVITZ, *Primary Examiner.*

ALPHONSO D. SULLIVAN, *Examiner.*